United States Patent [19]
Beitzel

[11] Patent Number: 6,079,689
[45] Date of Patent: Jun. 27, 2000

[54] MECHANICAL ARM MECHANISM FOR MOVABLY SUPPORTING MULTI-POSITION MULTIPLE USER SURFACE MEMBERS

[76] Inventor: Karl H Beitzel, 2855 Pine Creek Dr. #C-207, Costa Mesa, Calif. 92626-7416

[21] Appl. No.: 09/213,555

[22] Filed: Dec. 17, 1998

Related U.S. Application Data

[63] Continuation-in-part of application No. 08/574,293, Dec. 18, 1995, Pat. No. 5,865,414, which is a continuation-in-part of application No. 08/349,452, Dec. 2, 1994, abandoned, which is a continuation of application No. 08/128,004, Sep. 28, 1993, abandoned.

[51] Int. Cl.[7] ................................................. A47B 97/04
[52] U.S. Cl. .................... 248/447; 248/282.1; 248/454; 248/462
[58] Field of Search .................................. 248/447, 454, 248/455, 460, 462, 463, 144, 464, 145, 371, 398, 281.11, 284.1, 123.11, 282.1; 108/1, 4, 5, 9

[56] References Cited

U.S. PATENT DOCUMENTS

| | | | |
|---|---|---|---|
| 596,931 | 1/1898 | Yunck | 248/398 |
| 1,254,569 | 1/1918 | Boal | 248/457 |
| 1,847,398 | 3/1932 | Hurych | 108/4 |
| 1,897,321 | 2/1933 | Mitchell et al. | 108/4 |
| 1,900,250 | 3/1933 | Mitchell et al. | 108/4 |
| 2,743,550 | 5/1956 | Felice | 248/457 |
| 3,033,500 | 5/1962 | Graves | 248/284.1 X |
| 3,189,393 | 6/1965 | Crawford | 108/4 |
| 3,586,324 | 6/1971 | Bearson | 248/284.1 X |
| 3,605,650 | 9/1971 | Hebel et al. | 108/9 |
| 3,908,560 | 9/1975 | Horner | 108/4 |
| 4,196,674 | 4/1980 | Van Laarhoven | 108/4 |
| 4,726,556 | 2/1988 | Weir | 248/454 |
| 5,014,953 | 5/1991 | Warnan et al. | 248/284.1 X |
| 5,108,063 | 4/1992 | Koerber, Sr. et al. | 248/284 |
| 5,133,547 | 7/1992 | Pardi | 248/284.1 X |
| 5,292,097 | 3/1994 | Russell | 248/281.1 |
| 5,609,316 | 3/1997 | Tigliev | 248/123.11 |
| 5,825,536 | 10/1998 | Yasunaga et al. | 248/281.11 X |
| 5,865,414 | 2/1999 | Beitzel | 248/447 |
| 5,890,690 | 4/1999 | Klintberg | 248/281.11 X |
| 5,980,047 | 11/1999 | Kogita et al. | 248/281.11 X |

*Primary Examiner*—Ramon O. Ramirez
*Assistant Examiner*—Tan Le
*Attorney, Agent, or Firm*—Paul E Milliken; Ray L Weber; Lee A Germain

[57] ABSTRACT

A mechanical arm mechanism for moving a user surface such as an electronic monitor for a computer or television and a related keyboard or control board in an arcuate path from a stored position to one or more user positions at various selected elevations and angles of inclination. The mechanism uses at least one set of spaced apart swingable arms each of which has one end pivotally attached to a respective fixed pivot point on a support member and the opposite end pivotally attached to a respective movable pivot point on the bottom or back side of the electronic monitor with the lengths between the fixed pivot points, the moveable pivot points and the arms forming the sides of a quadrilateral which sides change their relative angular orientation as the table or board is moved in its arcuate path of travel. A similar group of swingable arms also forming a quadrilateral are pivotally connected at one end to fixed pivots on the support member and the opposite ends are pivotally attached to the keyboard or control board member to enable such member to move arcuately with the Monitor from the stored to a user position.

20 Claims, 9 Drawing Sheets

MECHANICAL ARM MECHANISM FOR MOVABLY SUPPORTING MULTI-POSITION MULTIPLE USER SURFACE MEMBERS

This invention in a continuation-in-part of Ser. No. 08/574,293, filed Dec. 18, 1995 now U.S. Pat. No. 5,865,414 which is a continuation-in-part of Ser. No. 08/349,452, filed Dec. 2, 1994 which is now abandoned and which in turn is a continuation of Ser. No. 08/128,004, filed Sep. 28, 1993 which is now abandoned.

FIELD OF INVENTION

This invention generally pertains to mechanical arm mechanisms which movably support multiple user surface members such as, electronic television or computer monitors, and their related control boards or keyboards and permit such equipment to be moved between a vertical stored position and a lowered user position. This type of arm mechanism can also support user surface members such as tables or similar board types of work surfaces from an initial position to one or more alternative positions.

More particularly, this invention provides a mechanical arm mechanism which may be configured for various sizes of user surface members depending upon its application and to a method of determining the multiple parameters of the mechanism such as to move the user surface member from an initial position to one or more alternative user positions, the method being applicable irrespective of the selected alternative user position.

BACKGROUND OF THE INVENTION

There are many and various types of mechanical arm mechanisms in the art and conventionally each is specific to a particular motion problem. Many of these comprise parallel arms or links which must remain parallel throughout the motion excursion while others comprise link-and-cam arrangements which compensate for possible interference between the links as they are moved from one position to an alternative position. Most of these prior art mechanisms must function in a limited way to move a table or like-type board surface from a first initial position to a second alternative user position and the same configuration of arm mechanism may not be reconfigured to other applications which effect a change in both of the initial and alternative user positions.

A typical example of a prior art arm mechanism is U.S. Pat. No. 596,931 issued to F Yunck which shows support arms pivotally attached to a floor to support a restaurant stool which can be moved from a horizontal user position to a vertical stored position next to a counter. This device is limited in its range of movement for its specific purpose and provides for no adjustability or for supporting any other kinds of equipment or multiple user surfaces.

The present invention is a further development of my previously mentioned copending application 08/574,293 and provides additional versatility for handling additional types of user equipment which need to be moved from a stored to a user position. The methods of establishing the positions of arm members and pivot points as described in my above mentioned prior application are equally applicable to this application. For brevity, all the prior description will not be repeated herein, however the methods and apparatus shown and disclosed therein are incorporated in their entirety in this application.

OBJECTS OF THE INVENTION

It is an object of this invention to provide a mechanical arm mechanism which may be applied to many various types of user surface members and equipment such as electronic monitors for televisions and computers and their related control boards or keyboards.

Another object of the invention is to provide a method of determining the various and multiple parameters which comprise a mechanical arm mechanism such that multiple user surface members may be moved from an initial position to an alternative user position, and this, irrespective of the selected alternative user position and not being constrained by parallel arm motion.

A further object of the invention is to provide a mechanical arm configuration which may comprise a two-arm configuration, a three-arm configuration or multiples of these such as to move various sized board surfaces from an initial vertical position to any other alternative position selected by the user.

A still further object of the invention is to provide a mechanical arm mechanism wherein the various and multiple parameters of the mechanism are preselected such as to provide a particular user surface motion exhibiting multiple alternative user positions and/or user surface angles.

These and other objects of the invention will become more fully apparent as the description proceeds in the following specification and the accompanying drawings.

SUMMARY OF THE INVENTION

A mechanical arm mechanism and user surface members in which the arm mechanism supports and moves the user surface members in arcuate paths of travel between a first and second position located remotely from each other at opposite ends of the path of travel comprising: a fixed support structure having at least a first and second fixed base pivot means attached thereto at spaced distances from each other; a primary user surface member; at least one secondary user surface member; at least a first and second swingable arm means, each having one end pivotally connected to the first and second fixed base pivot means respectively, each arm means swinging about it respective base pivot means when the user surface members are moved in their paths of travel between the first and second position; the opposite ends of the first and second swingable arm means being connected to a first and second movable pivot means attached to a back side of the primary user surface member; A third swingable arm means having one end pivotally connected to a third movable pivot means attached to the secondary user surface member and the opposite end pivotally connected to a base pivot means about which the third swingable arm means swings when the user surface members are moved in their paths of travel between the first and second position.

DESCRIPTION OF THE DRAWINGS

The invention is illustrated in the following drawing figures in which like-parts bear like reference numerals.

DESCRIPTION OF THE PREFERRED EMBODIMENTS

Figure 1:
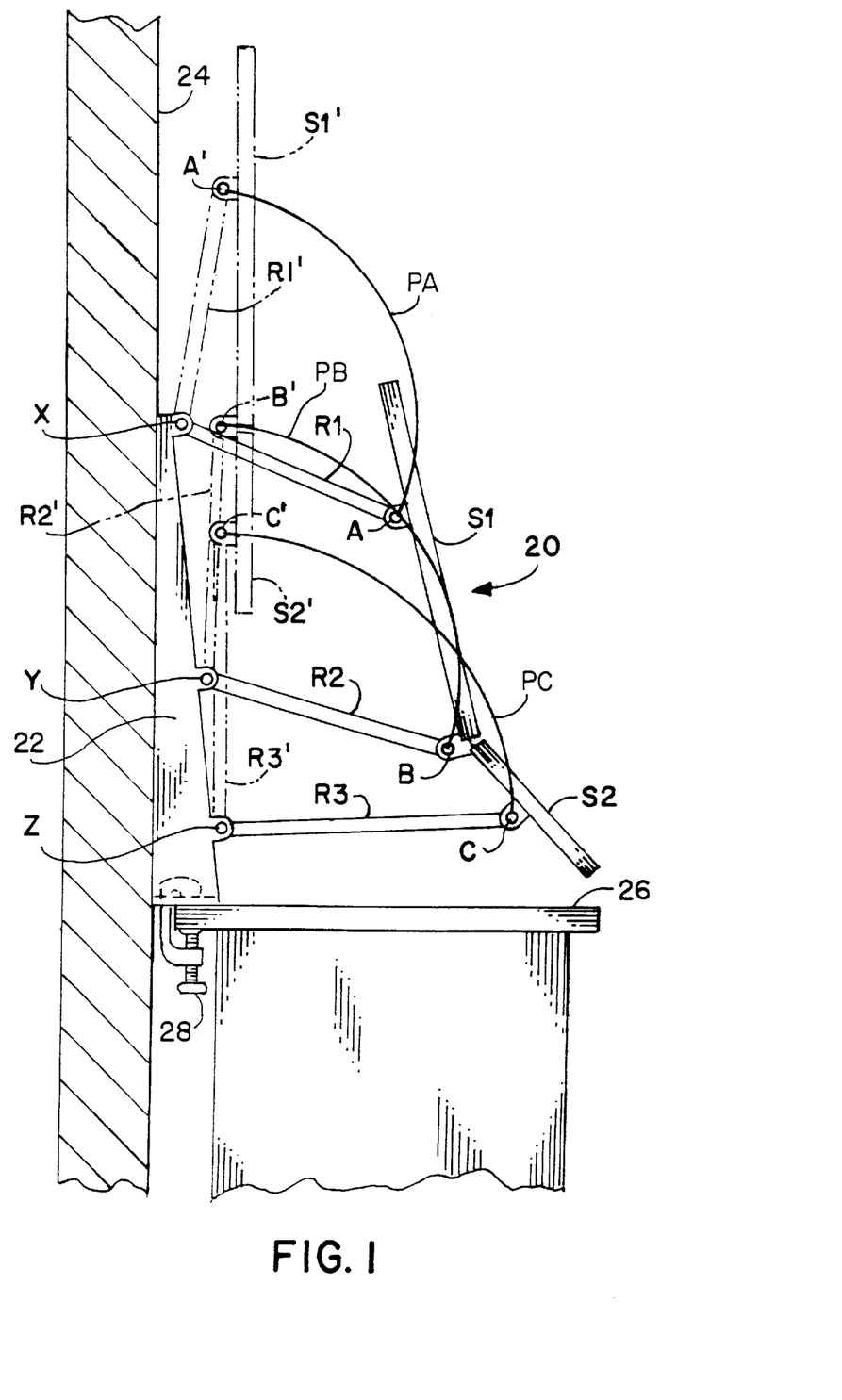
FIG. 1 is a side elevational view of a basic embodiment an adjustable arm mechanism of the invention which functions to move a pair of user surface members from initial firs positions shown in broken lines to alternative second user positions shown in solid lines.

FIG. 1 shows a mechanical arm mechanism indicated by the numeral 20. The arm mechanism 20 has at least one pair of arms R1 and R2 each rotatable about a pivot point X and Y respectively and movably carrying a primary user surface member S1 and a secondary surface ember S2 from a substantially vertical or first position where the user surface members are indicated as S1' and S2" shown in broken lines to an alternative second position shown in solid lines with the user surface members indicated as S1 and S2.

In most instances the raised vertical position is the stored position of the user surface members S1' and S2' and the lowered position is the user position. The parts referred to as user surface members may be various types of equipment but in this invention the most common items of equipment are considered to be electronic monitors for television and computers forming the primary surface member S1 are control boards or keyboards, both sometimes referred to herein as work boards forming the secondary surface member S2.

Still referring to FIG. 1, a fixed support structure 22 is mounted on a vertical wall 24 or may be clamped to a horizontal table 26 by one more clamps 28. The support structure 22 has three fixed base pivot pins X, Y and Z. Swingable arm members R1, R2 and R3 each have one end pivotally connected to the respective fixed base pivot pin and the opposite end pivotally connected to a respective movable pin A, B, and C attached to the backside of the surface members S1 and S2.

In this embodiment, the arm R2 connects to the pivot B which is joined to both member S1 and S2 and forms a common support thereforfor. Arm R1 is linked only to member S1 and arm R3 is linked only to the member S2.

Because of both S1 and S2 being linked together by pivot pin B, both members move simultaneously in respective arcuate paths PA, PB and PC between the stored position and the user position.

It should be understood that the assembly of arms R1, R2 and R3 can be duplicated in side by side pairs or other combinations as shown in FIGS. 8 and 9 of my prior application 08/574,293.

It should also be recognized that while FIG. 1 shows the members S1 and S2 moved between a vertical stored position and a lowered user position, it is also possible to vary the location of the user position as shown in FIG. 12 of prior application 08/574,293. It is also possible to adjust the angle of the user surface members as shown in FIGS. 13 and 14 of prior application 08/574,293.

Figure 2:
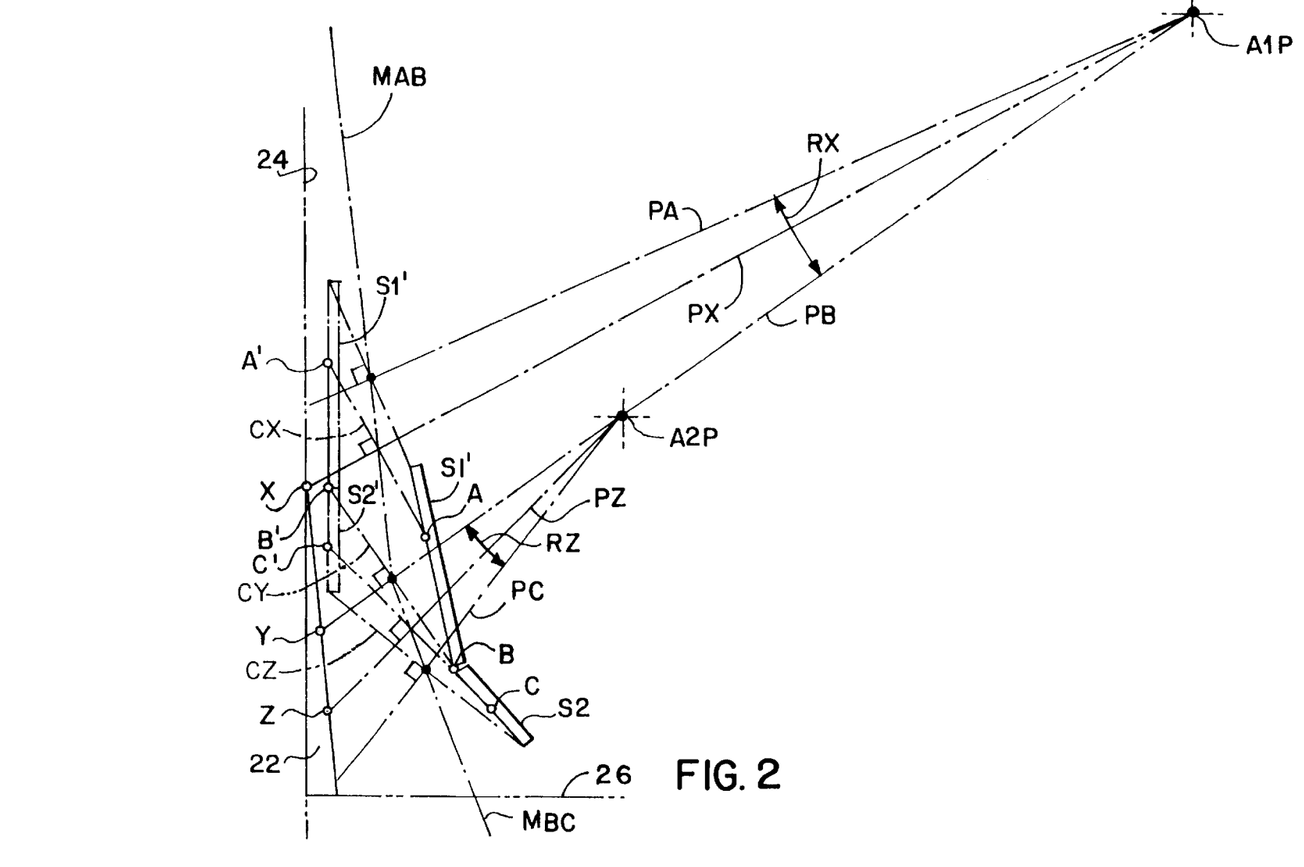
FIG. 2 diagrammatically illustrates a method according to this invention for determining the multiple parameters of an adjustable arm mechanism for any user position of the user surface members.

FIG. 2 shows an example of how projection lines are used to locate pivot pins A, B and C as well as pivot pins X, Y, and Z of FIG. 1. The steps in locating the pivot pins are described in the description of FIGS. 2A and 2B of prior application 08/574,293 and for simplicity will not be described in detail in this application. The layout of the lines in either application is essentially the same, the only difference in this application being that there are two or more user surface members rather than one.

The layout starts by arbitrarily establishing the location of the positions of member S1 and S2 in the stored and user position. Then by plotting lines PA, PB, PC, which converge to establish reference points, A1P and A2P, this establishes areas RX and RZ within which fixed pivot pins X, Y, and Z may be located. Lines PX, PZ, CX, CY, and CZ are then drawn in to establish the location of movable pivot pins A', A, B', B, C' and C.

Having established fixed pivot pins X, Y and Z and movable pivot pins A, B, and C the arms R1, R2 and R3 can be drawn in between the respective pivot pins and the length of the arms is thus established between their pivot pins.

The same sequence of establishing points and plotting lines can be followed for any arm assembly regardless of the number of arms and pivot points and regardless of the angular positions of the user surface members within their paths of travel. The arm and pivot pin layout for the other embodiments shown in the following FIGS. 6 through 11 can follow the same sequence as that shown in FIG. 2 for laying out the embodiment of FIG. 1.

Figure 3A:
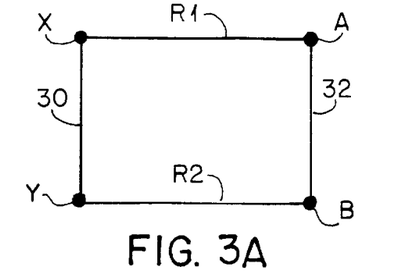
FIGS. 3A and 3B diagrammatically illustrate how the position of the arms and pivot points form a quadrilateral which may be have the lengths of its sides adjusted to change the angles of the user surface members.
Figure 3B:
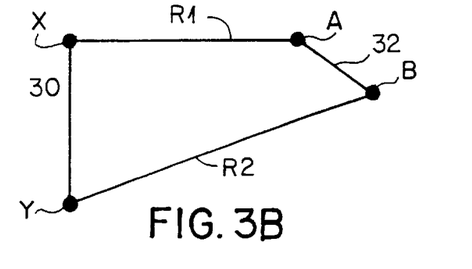

Referring now to FIG. 3A simplified diagram showing a pair of arms R1 and R2 are shown extending between pivot pins X and A and Y and B respectively. A line between pivots X and Y is identified as 30 and a line 32 extends between pivots A and B. In FIG. 3B line 32 has been shortened while the arm R2 has been lengthened. This causes the angle of the line 32, which represents the plane in which the user surface member lies, to change in FIG. 2 from its angle in FIG. 3A. This can be accomplished by the mechanism shown in FIGS. 12 and 13 of my prior application 08/574,293. In making such angle change, the total distance of the four lines around the quadrilateral does not change since the leg R2 is lengthened the same amount that line 32 is shortened.

Figure 4:
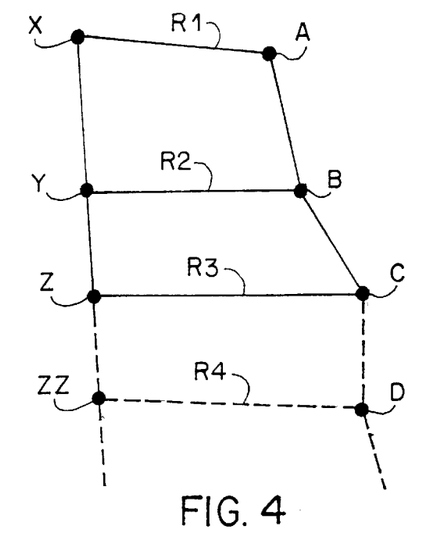
FIG. 4 shows how a plurality quadrilaterals such as that shown in FIGS. 3A and 3B can form a support arm assembly for multiple user surface members positioned at various angles.
Figures 5A, 5B:
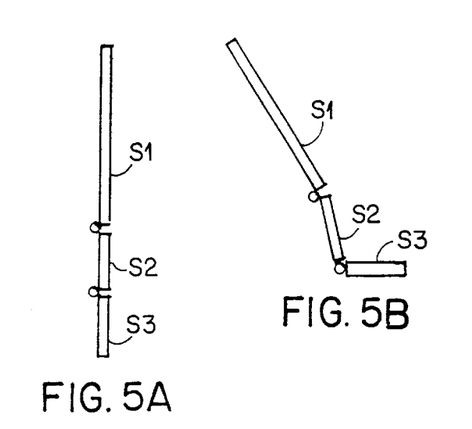
FIGS. 5A through 5E diagrammatically illustrate how a group of three user surface members can be adjusted with each user surface at various angles from the other user surface members.
Figure 5C:
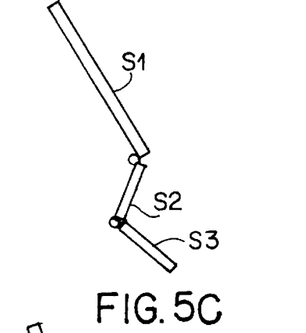
Figure 5D:
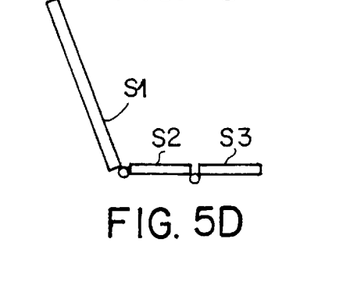
Figure 5E:
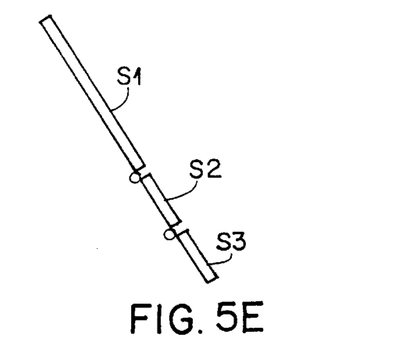

FIG. 4 shows how that three or more sets of quadrilaterals may be used together to form a system for supporting three or more user surface members with each member being movable to separate angles relative to the others members. FIG. 4 functions on the same principle as the embodiment of FIG. 1 but with more arms supporting more user surfaces.

FIGS. 5A through 5E shows a simplified side view of a group of three user surfaces members S1, S2 and S3 with the members being moved into different relative angles depending upon the angular positions required by the particular use.

Figure 6:
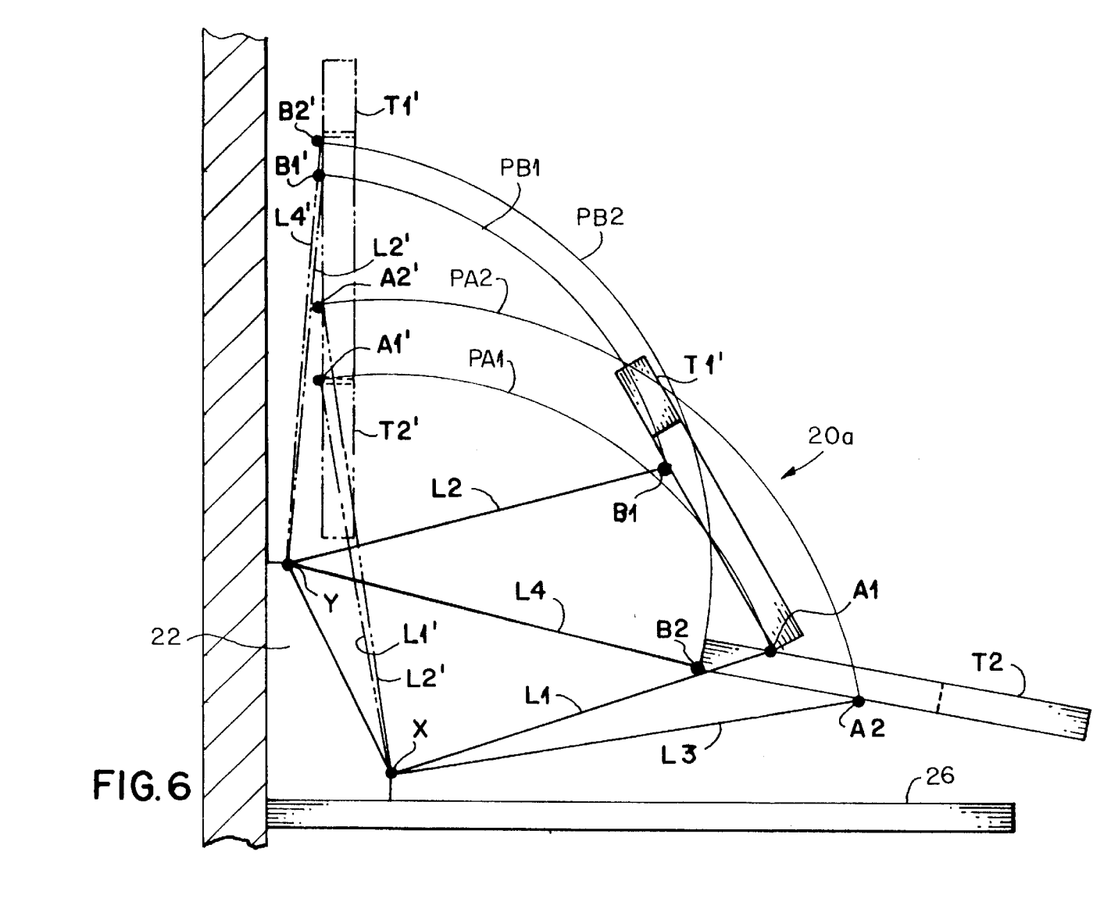
FIG. 6 shows a diagrammatic side view of another embodiment of the invention in which two user surface members assume a nesting relationship in which they occupy a common space when in a stored position.
Figure 7A:
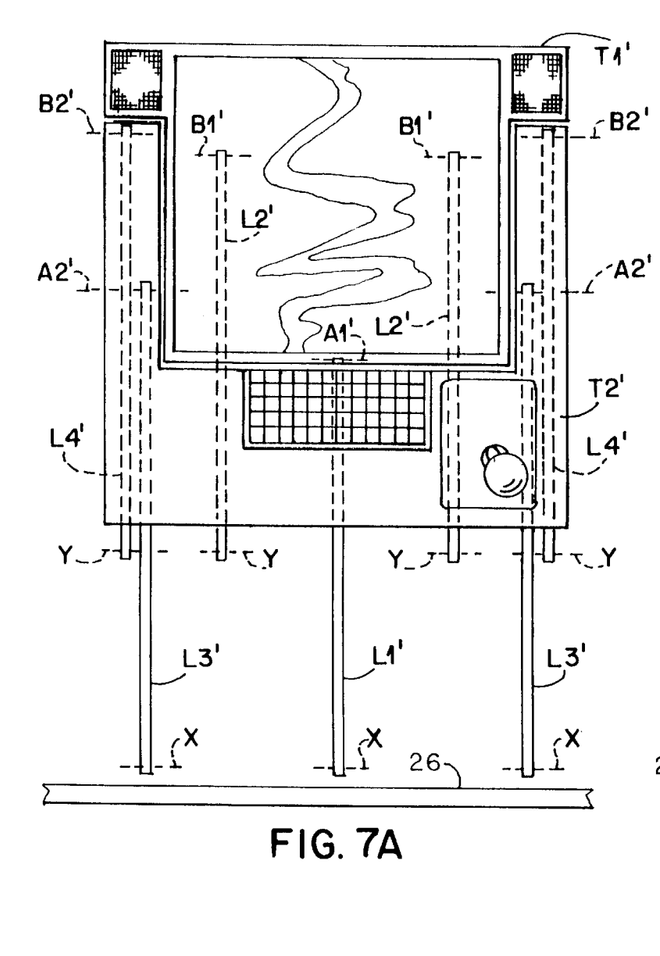
FIG. 7A shows a front view of the embodiment of FIG. 6 with the two user surface members in a nesting stored vertical position.
Figure 7B:
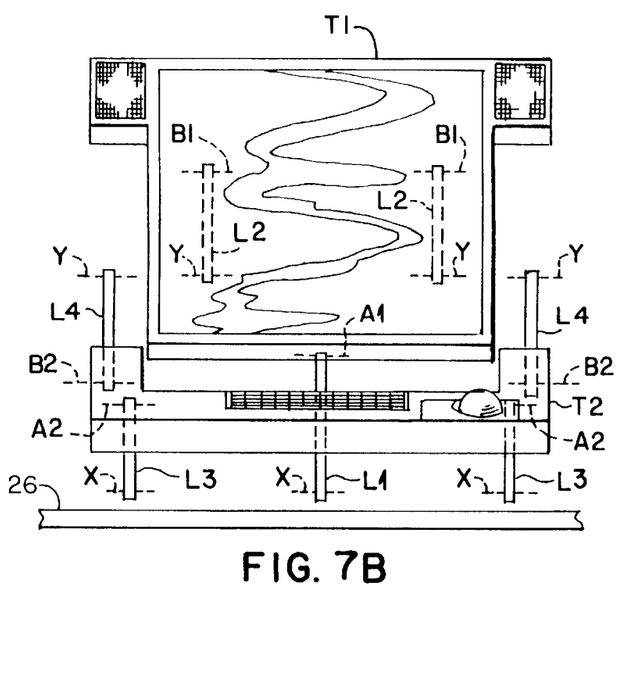
FIG. 7B shows a view of the same embodiment as FIG. 7A with the user surface members in a lowered user position.

FIG. 6 shows a diagrammatic side view similar to FIG. 1 but of a different embodiment in which the primary user surface member T1 is a computer monitor and the secondary user surface member is a computer keyboard. As may be seen when viewing FIGS. 6 through 7B, The computer T1' and keyboard T2' is in a nesting stored position in FIG. 7A and they occupy a common space. In FIG. 7B the computer T1 and keyboard T2 are moved to a lowered user position with the computer T1 assuming an angle with a higher angle of inclination and the keyboard T2 assuming a lower angle nearer to a horizontal position for ease of typing on the keyboard. In the lowered user position the computer T1 and keyboard T2 no longer are in a nesting position with each other. The numerals of like parts of FIG. 1 remain the same as in FIG. 1. Unlike the embodiment of FIG. 1 there is no common arm connected to both member T1 and T2. T1 is supported by arms L1 and L2, while member T2 is supported by a separate pair of arms L3 and L4. Each of the pivot pins A1, A2, B1 and B2 move in respective separate arcuate paths PA1, PA2, PB1 and PB2.

While not shown in the drawings, the members T1 and T2 can be mechanically linked together by various know means so movement of members T1 and T2 takes place automatically at the same time to permit smooth action of the members being moved from the stored to the user position and likewise when being returned to the stored position.

Referring now to FIGS. 8 through 11, these represent another embodiment in which all the working parts are similar except that in the different variations, the member T2 is moved about pivot C by four different linkage arm locations indicated by linkage arms R4, R4A, R4B and R4C shown respectively in FIGS. 8, 9, 10, AND 11. Each linkage arm instead of being attached to a pivot pin on the support structure 22, is pivotally connected to one of the arms R1 or R2 at a designated location, so that as the arm which it is connected to moves in an arcuate path it moves the pivot pin holding the respective linkage arm and thereby causes the linkage arm to move with the pivot pin.

Figure 8:
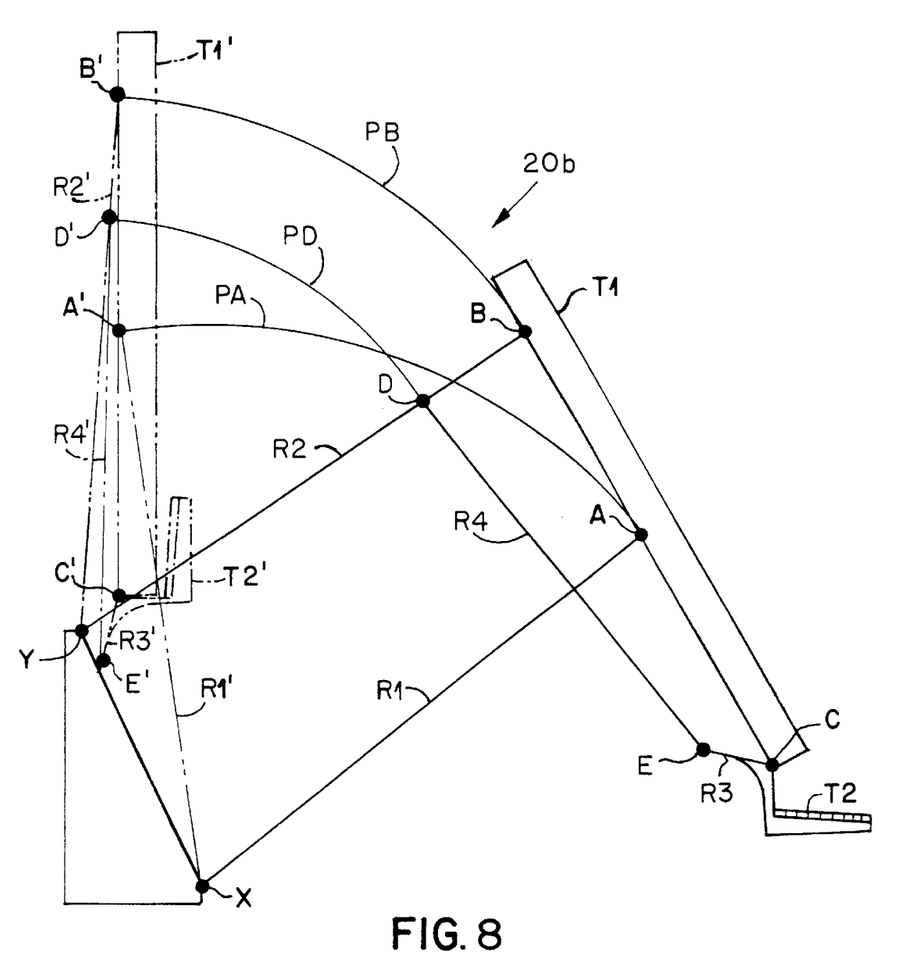
FIGS. 8 through 11 show other embodiments of the invention in which a primary user surface member is supported on a pair of swingable arm means and a secondary user surface member is moved by a pivotal linkage connection with the primary user surface
Figure 9:
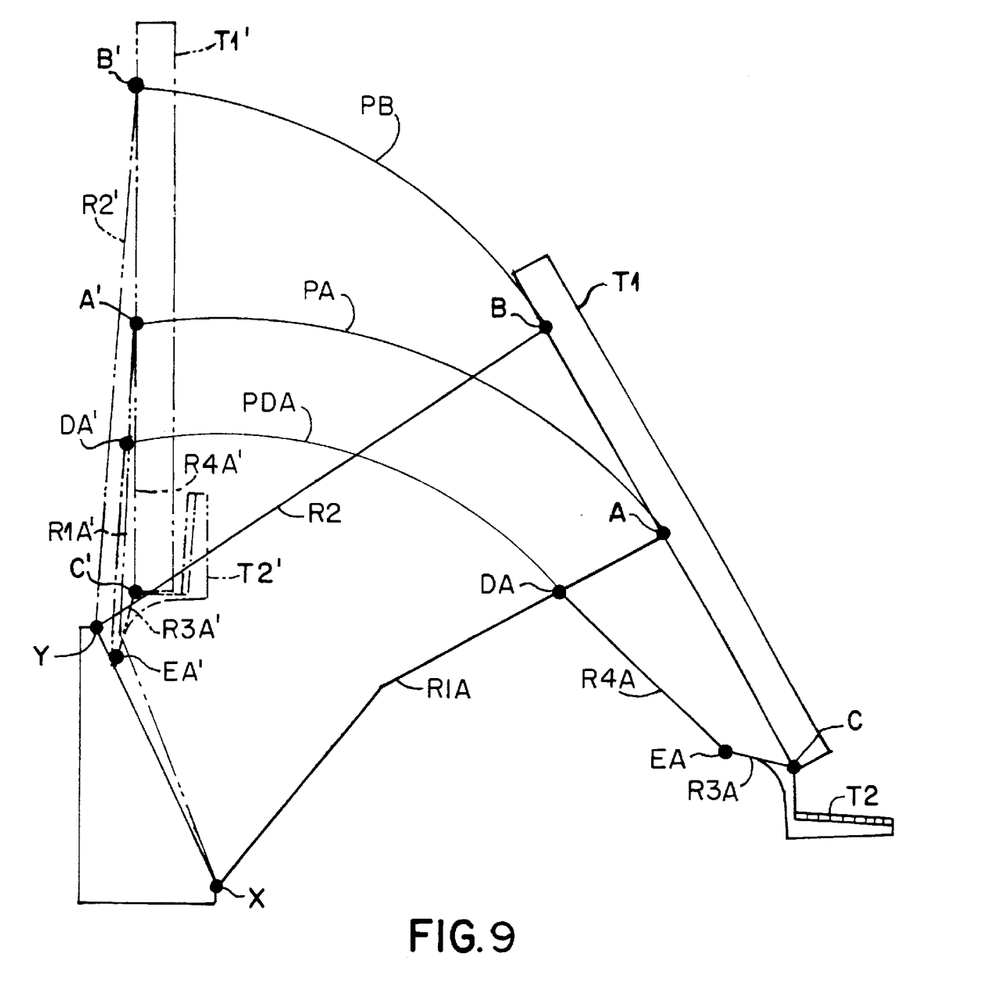
Figure 10:
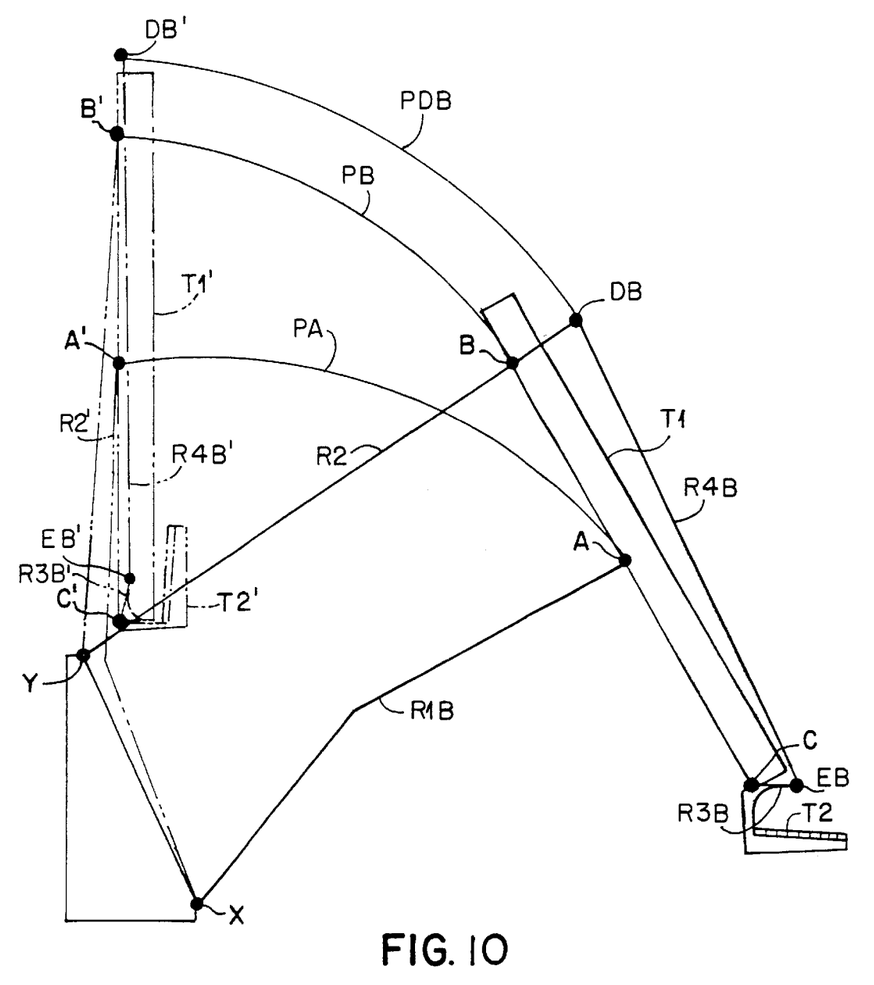
Figure 11:
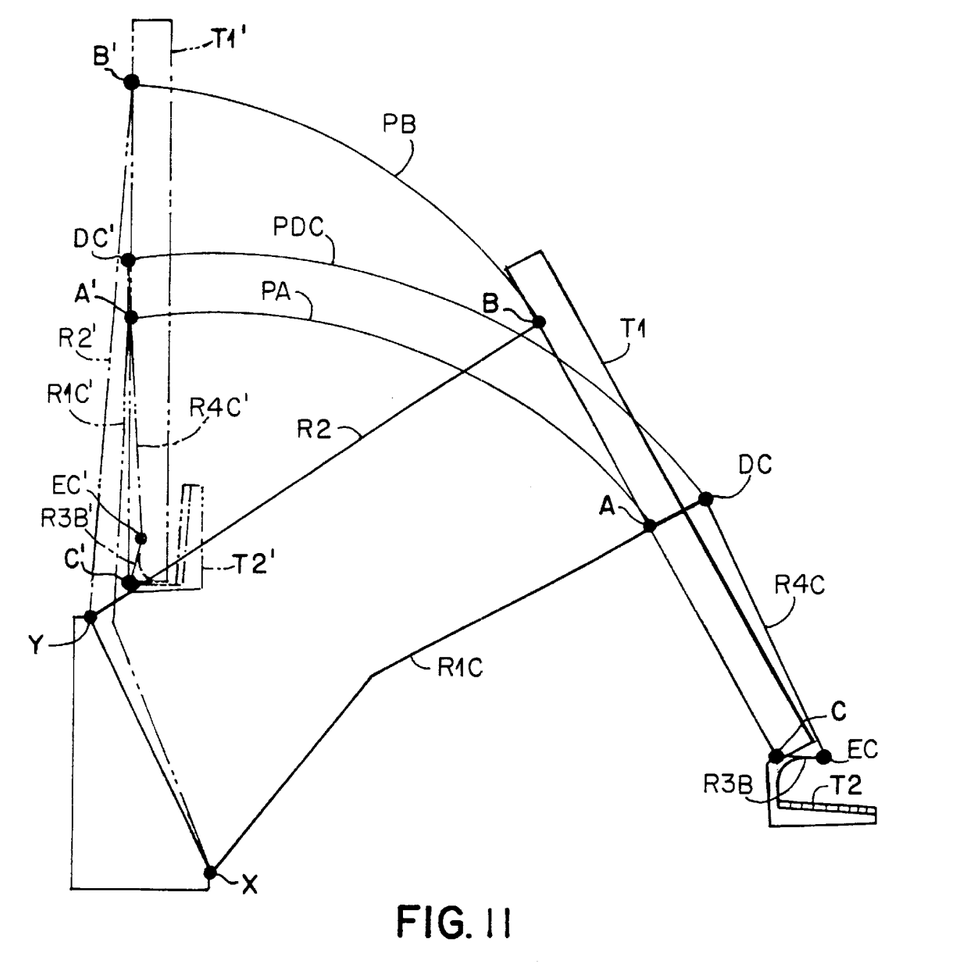

For example in FIG. 8 as the arm R2 moves, the pivot pin D moves pulling the linkage arm R4 with it. The opposite end of the arm R4 is pivotally connected to pivot pin E, through arm R3 connected to the member T2 and pivot pin C. As the arm mechanism 20b supporting members T1 and T2 is moved from the lowered user position shown in solid lines to the stored position shown in chain dotted lines, the linkage arm R4 causes the user surface member T2 to fold up as shown in T2'. The same action occurs with the other alternate arms R4A, R4B, and R4C shown respectively in FIGS. 9, 10, and 11. When the user surface members are moved to the user position, the linkage arm causes the member T2 to unfold to the desired position for use.

In FIGS. 8 through 11, the member T1 could be a monitor for either a television or computer screen and the member T2 could be a control board or keyboard.

While there are three basic variations of arm assemblies shown in this application, the basic features of all the variations is that a primary user surface member such as an electronic monitor is supported by legs forming at least one quadrilateral geometric figure and a secondary user surface member such as a control board or keyboard in moved by at least an additional arm which causes it to move with the primary user surface member when the entire arm assembly and user surface members are moved back and forth between a stored position and a user position.

Various other modifications can be made in the embodiments shown and described herein without departing from the scope of the invention.

I claim:

1. A mechanical arm mechanism and user surface members in which the arm mechanism supports and moves the user surface members in arcuate paths of travel between a first and second position located remotely from each other at opposite ends of the path of travel comprising:
    a fixed support structure having at least a first and second fixed base pivot means attached thereto at spaced distances from each other;
    a primary user surface member;
    at least one secondary user surface member;
    at least a first and second swingable arm means, each having one end pivotally connected to the first and second fixed base pivot means respectively, each arm means swinging about it respective base pivot means when the user surface members are moved in their paths of travel between the first and second position;
    opposite ends of the first and second swingable arm means being connected to a first and second movable pivot means attached to a back side of the primary user surface member;
    a third swingable arm means having one end pivotally connected to a third movable pivot means attached to the secondary user surface member and an opposite end pivotally connected to a base pivot means about which the third swingable arm means swings when the user surface members are moved in their paths of travel between the first and second position.

2. The arm mechanism and user surface members as claimed in claim 1 wherein the user surface members are a computer monitor and keyboard.

3. The arm mechanism and user surface members as claimed in claim 1 wherein the user surface members are a television monitor and control board.

4. The arm mechanism and user surface members as claimed in claim 1 wherein the third swingable arm means has one end pivotally connected to third movable pivot means and the opposite end connected to a fixed pivot means attached to the fixed support structure.

5. The arm mechanism and user surface members as claimed in claim 4 wherein the secondary moveable pivot means is connected to both the primary and secondary user surface member.

6. The arm mechanism and user surface members as claimed in claim 1 including a third and fourth arm means having one end connected respectively to a third and fourth fixed base pivot means and the opposite ends connected t o respective third and fourth movable pivot means.

7. The arm mechanism and user surface members as claimed in claim 1 wherein the primary and secondary user surfaces assume a nesting relationship with each other in the stored position.

8. The arm mechanism and user surface members as claimed in claim 1 wherein the third swingable arm means has one end pivotally connected to the first or second arm means and has its opposite end pivotally connected to a movable pivot means on the secondary user surface.

9. A mechanical arm mechanism and user surface members in which the arm mechanism supports and moves the user surface members in arcuate paths of travel between a first and second position located remotely from each other at opposite ends of the path of travel comprising:
    a fixed support structure having a first, second, and third fixed pivot means attached thereto;
    the first, second, and third fixed pivot means each having a horizontal axis which is parallel to the axis of other pivot means;
    a first and second user surface member each having a user surface facing away from the fixed support structure and a backside mounting surface facing toward the fixed support structure;

a first movable pivot means fixedly attached to the mounting surface of the first user surface member;

a second movable pivot means fixedly attached to the mounting surface of both the first and second user surface member at a spaced distance from the first moveable pivot means;

a third movable pivot means fixedly attached to the mounting surface of the second user surface member at a spaced distance from the second movable pivot means;

each of the first, second, and third movable pivot means having an axis which is parallel to the axis of the others and all said movable pivot means being simultaneously movable with their respective user surface member;

a first swingable arm means for supporting an end of one of the first user surface members, having one end pivotally connected to the first fixed pivot means and its opposite end pivotally connected to the first movable pivot means;

a second swingable arm means for supporting both an opposite end of the first user surface member and an end of the second user surface member, said second swingable arm means having one end pivotally connected to the second fixed pivot means and its opposite end pivotally connected to the second movable pivot means; and a third swingable arm means for supporting an end of the second user surface member opposite to the end supported by the second swingable arm means;

each of the swingable arm means adapted to pivot around its respective fixed pivot means when the user surface members are moved between their first and second positions.

10. The arm mechanism and user surface members as claimed in claim 9 wherein the user surface members are a computer monitor and keyboard.

11. The arm mechanism and user surface members as claimed in claim 9 wherein the user surface members are a television monitor and control board.

12. The arm mechanism and user surface members as claimed in claim 9 including a third and fourth arm means having one end connected respectively to a third and fourth fixed base pivot means and opposite ends connected to respective third and fourth movable pivot means.

13. The arm mechanism and user surface members as claimed in claim 12 wherein the primary and secondary user surfaces assume a nesting relationship with each other in the stored position.

14. A mechanical arm mechanism and electronic monitor in which the arm mechanism supports and moves the electronic monitor and at least one work board in arcuate paths of travel between a first and second position located remotely from each other at opposite ends of the path of travel comprising:

a fixed support structure having at least a first, second, and third fixed pivot means attached thereto at spaced distances from each other;

at least a first, second, and third swingable arm means, each having one end pivotally connected to the first, second, and third fixed pivot means respectively;

an electronic monitor at least a first work board;

opposite ends of the first and second swingable arm means being connected to a first and second movable pivot means attached to a back side of the electronic monitor, the second movable pivot means also being connected to the back side of the first work board;

opposite end of the third swingable arm means being pivotally connected to a third movable pivot means connected to the backside of the first work board at a spaced distance from the second movable pivot means;

each of the swingable arm means adapted to pivot around its respective fixed pivot means when the electronic monitor and work board are moved between their first and second positions.

15. The arm mechanism and electronic monitor as claimed in claim 14 including at least a second work board and at least a fourth swingable arm means having one end pivotally connected to the second work board and the opposite second end pivotally connect to a fourth fixed pivot means on the fixed support structure, the second work board being pivotally connected to the first work board to move simultaneously in an arcuate path with the first work board between their first and second positions.

16. A mechanical arm mechanism and electronic monitor in which the arm mechanism supports and moves the electronic monitor and at least one work board in arcuate paths of travel between a first and second position located remotely from each other at opposite ends of the path of travel comprising:

a fixed support structure having a plurality of fixed pivot means attached thereto at spaced distances from each other;

a plurality of swingable arm means having one end pivotally attached to one of the fixed pivot means and extending outwardly from the fixed support structure with opposite ends of the arm means pivotally attached to either the electronic monitor or a work board;

at least one swingable arm means being attached only to the electronic monitor;

at least one other swingable arm means being attached only to the work board;

at least one other swingable arm means being attached to both the electronic monitor and the work board and pivotally linking the electronic monitor and the work board together in such manner that the electronic monitor and the work board can both be moved simultaneously in arcuate paths between a vertical stored position and a lowered user position.

17. The arm mechanism and electronic monitor as claimed in claim 16 wherein the electronic monitor is a computer monitor and the work board is a keyboard.

18. The arm mechanism and electronic monitor as claimed in claim 16 wherein the electronic monitor is a television monitor and the work board is a control board.

19. The arm mechanism and electronic monitor as claimed in claim 16 wherein the electronic monitor and work board assume a nesting position sharing a common area of space in the vertical stored position.

20. The arm mechanism and electronic monitor as claimed in claim 16 wherein the electronic monitor and work board are each supported solely by their own individual swingable arm members without sharing a connection to any common arm member.

* * * * *